(12) United States Patent
Xu et al.

(10) Patent No.: US 10,822,130 B2
(45) Date of Patent: Nov. 3, 2020

(54) HOUSEHOLD VACUUM SEALER AND BAG-CUTTING SEALING METHOD

(71) Applicant: Bonsen Electronics Limited, Dong Guan (CN)

(72) Inventors: Ning Xu, Dong Guan (CN); QinCan Li, Dong Guan (CN); Xingbing Zhu, Dong Guan (CN); Haibo Peng, Dong Guan (CN)

(73) Assignee: Bonsen Electronics Limited, Guangdong (CN)

( * ) Notice: Subject to any disclaimer, the term of this patent is extended or adjusted under 35 U.S.C. 154(b) by 406 days.

(21) Appl. No.: 15/680,356

(22) Filed: Aug. 18, 2017

(65) Prior Publication Data

US 2018/0370669 A1 Dec. 27, 2018

(30) Foreign Application Priority Data

Jun. 21, 2017 (CN) .......................... 2017 1 0474003
Jun. 21, 2017 (CN) ..................... 2017 2 0723897 U

(51) Int. Cl.
*B29C 65/00* (2006.01)
*B65B 61/06* (2006.01)
(Continued)

(52) U.S. Cl.
CPC .............. *B65B 61/06* (2013.01); *B29C 65/02* (2013.01); *B29C 65/7451* (2013.01);
(Continued)

(58) Field of Classification Search
CPC .......... B29C 66/0145; B29C 66/00145; B29C 66/82423; B29C 66/82661; B65B 31/024; B65B 31/048; B65B 31/146; B65B 31/04
(Continued)

(56) References Cited

U.S. PATENT DOCUMENTS

| 2005/0005755 A1* | 1/2005 | Turvey | B26D 1/04 |
| | | | 83/614 |
| 2010/0095638 A1* | 4/2010 | Zakowski | B65B 31/046 |
| | | | 53/433 |
| 2015/0367973 A1* | 12/2015 | Owens | B65B 31/048 |
| | | | 53/408 |

* cited by examiner

Primary Examiner — Chelsea E Stinson
(74) Attorney, Agent, or Firm — Karin L. Williams; Mayer & Williams PC

(57) ABSTRACT

The present invention discloses a household vacuum sealer and a bag-cutting sealing method. In the household vacuum sealer, at least one cutter device is slidably mounted on the upper hood, a heat-seal bar and an evacuative groove are arranged at the front side of the upper portion of the lower hood, the upper hood or the lower hood is provided with a bag receiving chamber, a detachable automatic rollback shaft is rotatably mounted in the bag receiving chamber, the elastic rollback mechanism for automatically rolling the rollback shaft back and the elastic unidirectional locking mechanism for locking the automatic rollback shaft are mounted at the end portion of the automatic rollback shaft; the cutter device protrudes from a bottom surface of the upper hood, and the cutter moves at one side of the heat-seal bar or one side of the evacuative groove back and forth after the upper hood is locked onto the lower hood, for cutting off the bag pressed tightly between the upper hood and the lower hood. The present invention has a simple structure since the bag is cut at the original heat-seal bar or the evacuative groove of the lower hood, which is more convenient. Subsequent to cutting off the bag, the vacuum packaging bags are automatically rolled back after the hood is opened, which reduces the number of operation steps for the user, and exhibits ease and quickness of operation.

10 Claims, 11 Drawing Sheets

(51) Int. Cl.

| | |
|---|---|
| *B29C 65/74* | (2006.01) |
| *B65B 31/04* | (2006.01) |
| *B65B 51/14* | (2006.01) |
| *B29C 65/02* | (2006.01) |
| *B29C 65/78* | (2006.01) |
| *B65B 31/02* | (2006.01) |
| *B65B 41/12* | (2006.01) |
| *B65B 51/10* | (2006.01) |
| B29L 31/00 | (2006.01) |
| B29C 65/18 | (2006.01) |

(52) U.S. Cl.
CPC ...... *B29C 65/7891* (2013.01); *B29C 66/1122* (2013.01); *B29C 66/43121* (2013.01); *B29C 66/8221* (2013.01); *B29C 66/8324* (2013.01); *B29C 66/849* (2013.01); *B65B 31/024* (2013.01); *B65B 31/048* (2013.01); *B65B 41/12* (2013.01); *B65B 51/10* (2013.01); *B65B 51/146* (2013.01); *B29C 65/18* (2013.01); *B29C 66/00145* (2013.01); *B29C 66/344* (2013.01); *B29L 2031/7128* (2013.01)

(58) Field of Classification Search
USPC .................................. 53/428, 432, 434, 510
See application file for complete search history.

HOUSEHOLD VACUUM SEALER AND BAG-CUTTING SEALING METHOD

This application claims the benefit of China application number: 201710474003.2 file on Jun. 21, 2017 and 201720723897.X filed on Jun. 21, 2017. The content of these documents and the entire disclosure of publications, patents, and patent documents mentioned herein are incorporated by reference.

TECHNICAL FIELD

The present invention relates to the technical field of household vacuum sealers, and in particular, to a household vacuum sealer and a bag-cutting sealing method thereof.

BACKGROUND

A household vacuum sealer is provided with an upper hood and a lower hood equipped with an evacuative groove. In the case of evacuation, an opening of a vacuum packaging bag is inserted into the evacuative groove, then the vacuum packaging bag is evacuated through the evacuative groove after a vacuum pump communicating with the evacuative groove is started, and finally the opening of the vacuum packaging bag is heat sealed by a heat-seal bar of the lower hood.

In the case of evacuating a vacuum packaging bag roll, in order for a user to cut the bags conveniently, a cutter box and a sliding cutter are usually mounted at a top surface of the upper hood of the household vacuum sealer. As shown in the Chinese patent No. 201020127855.8 entitled "plastic bag sealer" and the Chinese patent No. 201120209473.4, entitled "household vacuum sealer with improved cutting device", the vacuum packaging bag used in the household vacuum sealer is a bag roll with two sealed sides. Therefore, in use, it is necessary to firstly cut off a bag, and, then to heat seal the two ends of the bag by the heat-seal bar of the household vacuum sealer to form a vacuum packaging bag. Both the upper hood and the lower hood are provided with heat-seal bars, which is complex in structure and high in cost.

The above-mentioned household vacuum sealer is cumbersome to use since the bag roll needs to be moved to the cutter box at the top surface of the upper hood firstly, a front end portion of the bag of the vacuum packaging bag roll is penetrated through or pressed tightly on the cutter box at the top surface of the upper hood, the bag is cut off by the sliding cutter, then the cut-off bag is transferred to the evacuative groove, the one end portion thereof is heat sealed to form a bag to put food therein, and the other end portion is inserted into the evacuative groove to be evacuated and heat sealed after the food is put inside.

As for a vacuum packaging machine with an inner receiving cavity where a vacuum packaging bag roll is placed, in the case of cutting off the bag, the bag placed in the receiving cavity of the household vacuum sealer needs to be pulled out by a longer length, the bag may be pulled to the cutter to be cut off only if the length of the pulled-out bag is certainly much larger than that of the cut-off bag, then the remaining bags have to be rolled back manually, such that they are retractable into the bag receiving cavity, the one end portion of the bag is transferred to the evacuative groove, and the one end portion is heat sealed, which is inconvenient to use. Therefore, it needs to make improvements.

SUMMARY

In view of the defects in the prior art, the present invention has an objective to provide a bag-cutting sealing method of a household vacuum sealer, which has reduced number of operation steps for the user, and exhibits ease and quickness of operation.

In order to achieve the above objective, the technical solution of the present invention is as follows. A bag-cutting sealing method of a household vacuum sealer includes the following steps of:

1) fixing a vacuum packaging bag roll at an automatic rollback shaft, mounting two end portions of the automatic rollback shaft in a shaft mounting cavity at two sides of the household vacuum sealer, such that the vacuum packaging bag roll is received in a bag receiving chamber of the household vacuum sealer;

2) pulling the vacuum packaging bag roll by an appropriate length out of the household vacuum sealer with the bag stretching across a top surface of a hood, locating the bag to be cut off in an evacuative groove which is arranged on a lower hood and configured to evacuate; in pulling out the bag, the automatic rollback shaft goes after to rotate, and part of a torsion generated in the rotation of the automatic rollback shaft is transmitted to an elastic energy storage element in an elastic rollback mechanism by means of the elastic rollback mechanism mounted at an end portion of the automatic rollback shaft, such that the elastic rollback mechanism exerts an acting force to the automatic rollback shaft for realizing its reverse rotation; locking the automatic rollback shaft to prevent its reverse rotation by an unidirectional rotation limiting latch installed on the lower hood;

3) keeping the pulled-out bag still and locking an upper hood, pressing tightly the bag by the upper hood locked onto the lower hood, abutting the unidirectional rotation limiting latch mounted on the lower hood by an unlocking rod fixed on the upper hood, such that the unidirectional rotation limiting, latch unlocks the automatic rollback shaft which reversely rotates and strains the bag due to the torsion of the elastic rollback mechanism, so as to tension the bag at the top surface of the lower hood;

4) cutting of the bag: sliding the cutter device mounted on the upper hood from one side to the other side, cutting off the tensioned bag by a cutter of the cutter device which protrudes from a bottom surface of the upper hood and is located at the side of the evacuative groove, automatic rollback shaft reversely rotating due to the torsion of the elastic rollback mechanism, and automatically rolling the cut-off bag outside the bag receiving chamber back onto the vacuum packaging bag roll in the bag receiving chamber;

5) heat sealing the bag: heat sealing the end portion of the bag by a heart-seal bar which is mounted on the lower hood, is located at the side of the evacuative groove and is configured to heat seal after evacuation; this step is set to be conducted automatically after the upper hood is locked or to be conducted after the user touches the corresponding control key;

6) opening the upper hood, the unlocking rod of the upper hood releasing from the unidirectional rotation limiting latch with the rotation of the upper hood, the elastic unidirectional locking mechanism resetting and locking the automatic rollback shaft;

7) taking out the cut-off bag to finish the heat-sealing of the end portion of the bag.

In view of the defects in the prior art, the present invention has an objective to provide a household vacuum sealer able to automatically roll back bags after the bag is cut off, which has reduced number of operation steps for the user, and exhibits ease of operation.

In order to achieve the above objective, the present invention adopts the following technical solution. A household vacuum sealer includes an upper hood, a lower hood and a cutter device, wherein the upper hood is rotatably mounted on the lower hood, at least one evacuative groove are arranged at the upper portion of the lower hood, the upper hood and/or the lower hood is provided with a bag receiving chamber, at least one pushing portion is arranged at the upper portion of the cutter device, at least one cutter is arranged at its lower portion; at least one sliding groove is disposed at a top surface or a front end surface of the upper hood, the pushing portion is slidably mounted in the sliding groove; the cutter protrudes from the bottom surface of the lower hood at least upon cutting the bag; after the upper hood is locked onto the lower hood, the cutter moves at one side of the heat-seal bar or one side of the evacuative groove back and forth, for cutting off the bag pressed tightly between the upper hood and the lower hood.

In a further solution, the top half of the cutter device is slidably mounted in the front end portion of the upper hood, the lower portion of the cutter device protrudes from the bottom surface at the front end portion of the lower hood at least upon cutting the bag; the pushing portion protrudes from the top surface or the front end surface of the upper hood;

the cutter device and the cutter are kept protruding from the bottom surface of the lower hood all the time; or the cutter device and the cutter protrude from the bottom surface of the lower hood only upon cutting the bag;

the cutter device or the pushing portion drives the cutter to eject downwards due to an external force or a switching mechanism.

In a further solution, a belt is mounted inside the front end portion of the upper hood; at least one sliding portion is slidably mounted at the top surface or front end surface of the front end portion of the upper hood, for driving the belt to move back and forth; an inner end portion of the pushing portion is fixed to the belt; the cutter device is fixed to the belt which drives the cutter device to move back and forth upon moving back and forth.

In a further solution, the cutter device includes a cutter box and a cutter, wherein the cutter includes at least one blade, one side of the blade has one cutting edge facing toward an outer side, and the cutting edges of the two blades incline.

In a further solution, the cutter includes two blades, each of which is formed by breaking off a blade of a box cutter along its fold; the two blades are fixed at the left and right sides of the cutter box respectively, and the cutting edges of the two blades face towards the outer side respectively, and are arranged in a "V" shape.

In a further solution, a hook portion is filmed at the lower portion of the cutter box, the middle of the hook portion is connected to the cutter box, two bag putting notches are formed at the left and right sides over the hook portion respectively, and the cutting edges of the two blades protrude in the bag putting notch respectively.

In a further solution, a clearance groove is arranged on the lower hood. After the upper hood is locked onto the lower hood, the hook portion is inserted into the clearance groove and slides in the clearance groove back and forth, and the bag pressed tightly between the upper hood and the lower hood is located in an opening of the bag putting notch in a height direction;

the cutting edge is located at an inner end portion of the bag putting notch, and an acute angle is formed between the inclining cutting edge and the bottom surface of the bag putting notch.

In a further solution, a limiting sliding groove is arranged at the bottom surface of the upper hood, and is parallel with the heat-seal bar or the evacuative groove, several transmission studs are mounted in the upper hood, the annular belt is tensioned into a square shape by the transmission studs, the part of the belt close to the outer end surface of the upper cover is a driving belt body, the part of the belt away from the outer end surface of the upper cover is a driven belt body, the pushing portion is fixed to the driving belt body, the cutter device is fixed at a driven belt body which slides in the limiting sliding groove back and forth together with the cutter device.

In a further solution, a rear end portion of the upper hood is rotatably mounted at a rear end portion of the lower hood, the heat-seal bar and the evacuative groove are arranged at a top surface of the front end portion of the lower hood, the heat-seal bar and the evacuative groove are arranged alternately in parallel and extend along a length direction of the lower hood, the bag receiving chamber is disposed at the top surface of the rear end portion of the lower hood, the left and right end portions of the bag receiving chamber are provided with a shaft mounting cavity respectively; a detachable automatic rollback shaft is rotatably mounted in the bag receiving chamber, for passing through a shaft cavity in the middle of the vacuum packaging bag roll, the left and right end portions of the automatic rollback shaft are movably placed in the left and right shaft mounting cavities respectively; the elastic rollback mechanism for automatically rolling the rollback shaft back and the elastic unidirectional locking mechanism for locking the automatic rollback shaft are mounted at the end portion of the automatic rollback shaft.

In a further solution, the elastic unidirectional locking mechanism includes a driving wheel, a unidirectional rotation limiting latch and an unlocking rod for changing the state of the unidirectional rotation limiting latch, wherein the driving wheel is fixed at a first end portion of the automatic rollback shaft, the unidirectional rotation limiting latch is movably mounted on the lower hood, and is elastically abutted against the driving wheel for enabling only the unidirectional rotation of the automatic rollback shaft and rolling out the bag; the unlocking rod is fixed on the upper hood, and touches the unidirectional rotation limiting latch after the upper hood is locked onto the lower hood, to unlock the driving wheel by the unidirectional rotation limiting latch.

In a further solution, a latch chamber is arranged on the lower hood, the upper portion of the latch chamber communicates with that of the shaft mounting cavity for receiving the first end portion of the automatic rollback shaft; the unidirectional rotation limiting latch is rotatably mounted in the latch chamber, the front end portion of the unidirectional rotation limiting latch passes through the upper portion of the latch chamber to extend into its adjacent shaft mounting cavity; a spring is mounted in the latch chamber, and is connected with the unidirectional rotation limiting latch, for exerting an elastic force to the unidirectional rotation limiting latch such that it elastically abuts against the driving wheel.

In a fluffier solution, several hook teeth are formed at the wheel body or surface of the driving wheel in a circumferential direction:

a latch hook is formed at a first side of the unidirectional rotation limiting latch, an unlocking driving portion is formed at its second side, a driving slot is formed on the unlocking driving portion, the middle of the unidirectional rotation limiting latch is pivotably connected to the lower hood, the latch hook passes through the upper portion of the latch chamber and extends into its adjacent shaft mounting cavity, the latch hook is elastically abutted against the hook teeth of the driving wheel, the lower end of the spring is mounted to the bottom of the latch chamber, and its upper end is connected to the unlocking driving portion, for exerting an upward elastic force to the unlocking driving portion; after the upper hood is locked onto the lower hood, the unlocking rod is inserted into the driving slot, for driving the latch hook to move upwards and release from the hook teeth, so as to unlock the driving wheel by the unidirectional rotation limiting latch.

In a further solution, the elastic rollback mechanism includes an end cap, an elastic energy storage element and an inner cap component, wherein an embedding chamber is arranged at a second end portion of the automatic rollback shaft, an inner cap component is fixed in the embedding chamber; the end cap is rotatably mounted at the inner cap component, the end cap protrudes from a second end portion of the automatic rollback shaft, and the end cap is movably snapped in the shaft mounting cavity for receiving the second end portion of the automatic rollback shaft, the first end of the elastic enemy storage element is connected with the inner cap component, and the second end thereof is connected with the end cap; the inner cap component includes an inner cap, a middle cap and a torsion transmitting element, wherein a torsion chamber is arranged at one side of the inner cap, the torsion transmitting element is rotatably mounted into the torsion chamber, several recesses are formed at an inner wall surface of the torsion chamber in a circumferential direction, a shaft hole is arranged in the middle of the inner cap; a torsion shaft protrudes from one side of the torsion transmitting element towards the end cap, the torsion shaft is rotatably mounted to the shaft hole of the inner cap, an outer end portion of the torsion shaft passes through the shaft hole, and is connected to the first end of the elastic energy storage element; at least two clamping arms extend out of the torsion transmitting element in a radial direction, a projection is formed at an outer end portion of the elastic clamping arm, and is elastically abutted in the recess at the inner wall surface of the torsion chamber; the first side of the middle cap is fixed to the inner cap, the inner end portion of the end cap is rotatable mounted to the middle cap which is provided with an energy storage cavity in the middle, the elastic energy storage element is located in the energy storage cavity and is selected from one of elastic steel wire, torsional spring, spiral spring or shrapnel.

A through hole is arranged in the middle of the middle cap, and is less than the energy storage cavity. A snap ring is formed at a connected surface between the through hole and the energy storage cavity, several buckling feet are formed at one side of the end cap towards the middle cap, each buckling foot passes through the through hole and is movably buckled to the snap ring respectively, and an outer side surface of each buckling foot has an arc surface with the same radius, and an outer side surface of each buckling foot is rotatably matched with the through hole;

the projection and the recess have a stationary fit status and a tripping fit status.

In the case that the elastic force of the elastic energy storage element is less than a friction force between the projection and the recess, the projection and the recess are in a stationary fit status, the automatic rollback shaft dries the inner cap, the elastic clamping arm and the torsion shaft to rotate upon rotating, and the elastic energy storage element is in a state of energy storage upon the rotation of the torsion shaft;

in the case that the elastic force of the elastic energy storage element is larger than the friction force between the projection and the recess, the projection and the recess are in a tripping fit status, the automatic rollback shaft drives the inner cap to rotate upon rotating, the elastic clamping arm is substantially stationary in the torsion chamber, and the projection of the elastic clamping arm skips to the next adjacent recess from the current matched recess while the inner cap rotates with respect to the elastic clamping arm.

In a further solution, the middle portion of the elastic clamping arm has at least one elastic zigzag portion; the projection has a cylindrical outer side surface, the recess has an arc surface whose shape is matched with that of the outer side surface of a protruding stud; a groove is arranged at an outer end portion of the torsion shaft, the first end of the elastic energy storage element is clamped in the first groove of the torsion shaft; a connecting portion is formed in the middle of one side of the end cap towards the middle cap, the outer end portion of the connecting portion is provided with a second groove, the first end of the elastic energy storage element is clamped into the second groove of the connecting portion, each buckling foot is distributed in the ring-shaped region of an outer edge of the connecting portion; at least one groove chamber is formed at the surface of the automatic rollback shaft, the groove chamber extends in the length direction of the automatic rollback shaft, an elastic supporting plate for being supported in the shaft cavity of the vacuum packaging bag roll is mounted in the groove chamber, and a spring is mounted at the bottom surface of the elastic supporting plate, for elastically abutting against the elastic supporting plate outwards.

Compared with the prior art, the present invention has the following advantages of more conveniently cutting and heat sealing the bag, automatically rolling the vacuum packaging bag back after the hood is opened subsequent to cutting off the bag, reducing the number of operation steps for the user, and exhibiting ease and quickness of operation.

The household vacuum sealer according to the present invention has a simple structure since the bag is cut at the original heat-seal bar or the evacuative groove of the lower hood, which is more convenient. Subsequent to cutting off the bag, the vacuum packaging bags are automatically rolled back after the hood is opened, which reduces the number of operation steps for the user, and exhibits ease and quickness of operation.

BRIEF DESCRIPTION OF THE DRAWINGS

The present invention will be further explained below in combination with the drawings and embodiments.

In the drawings.

Figure 1:
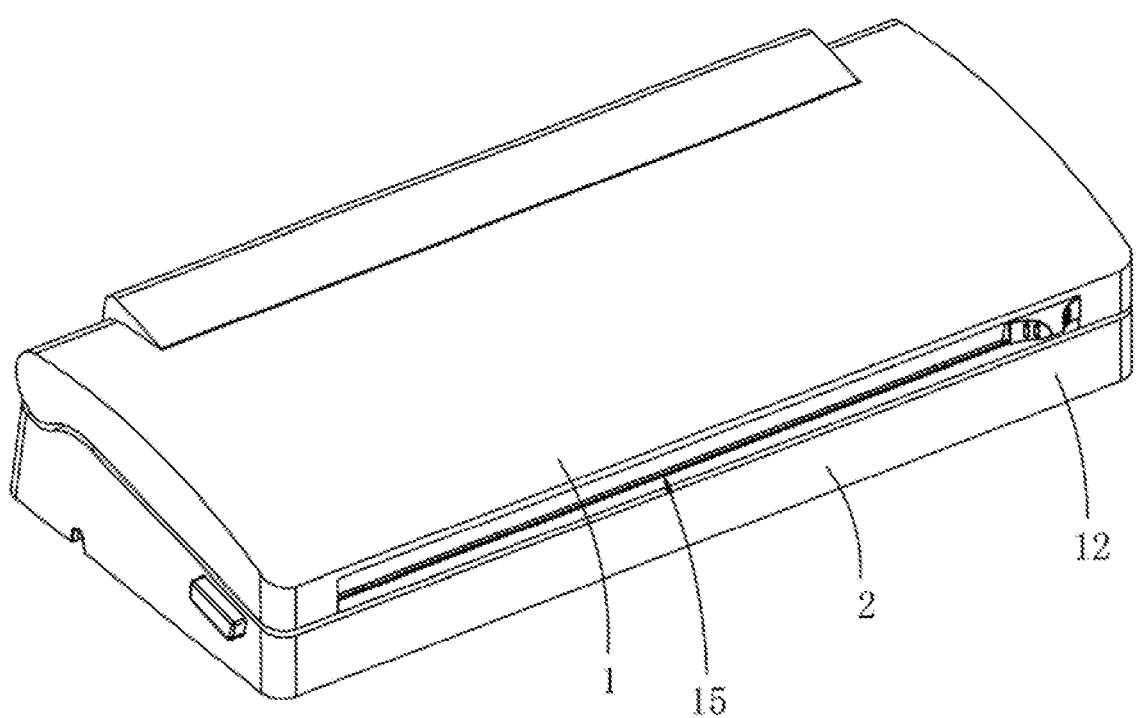
FIG. 1 is a schematic diagram of a structure of a household vacuum sealer according to the present invention.
Figure 2:
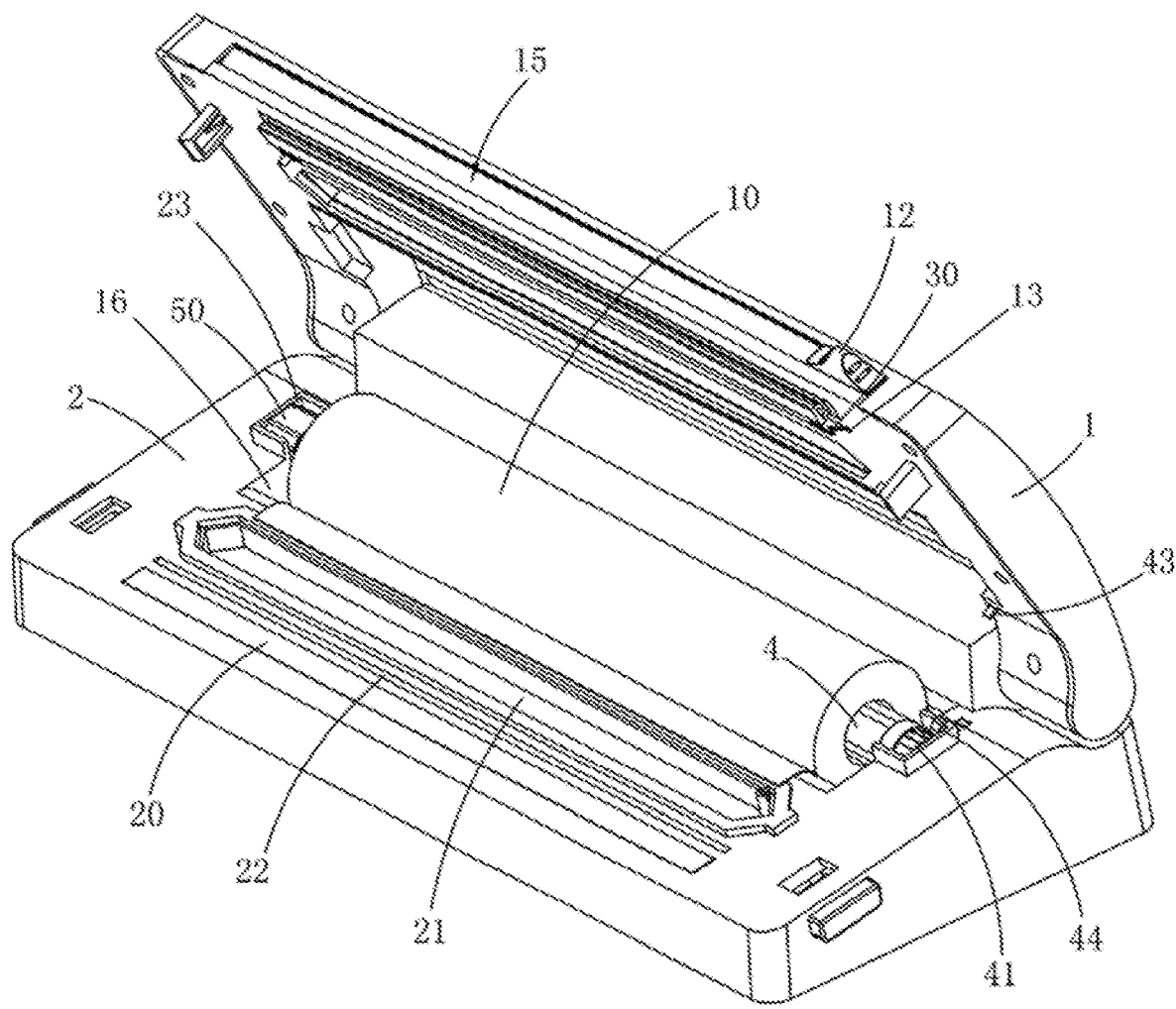
FIG. 2 is a schematic diagram of a structure with an upper hood opened according to the present invention.
Figure 3:
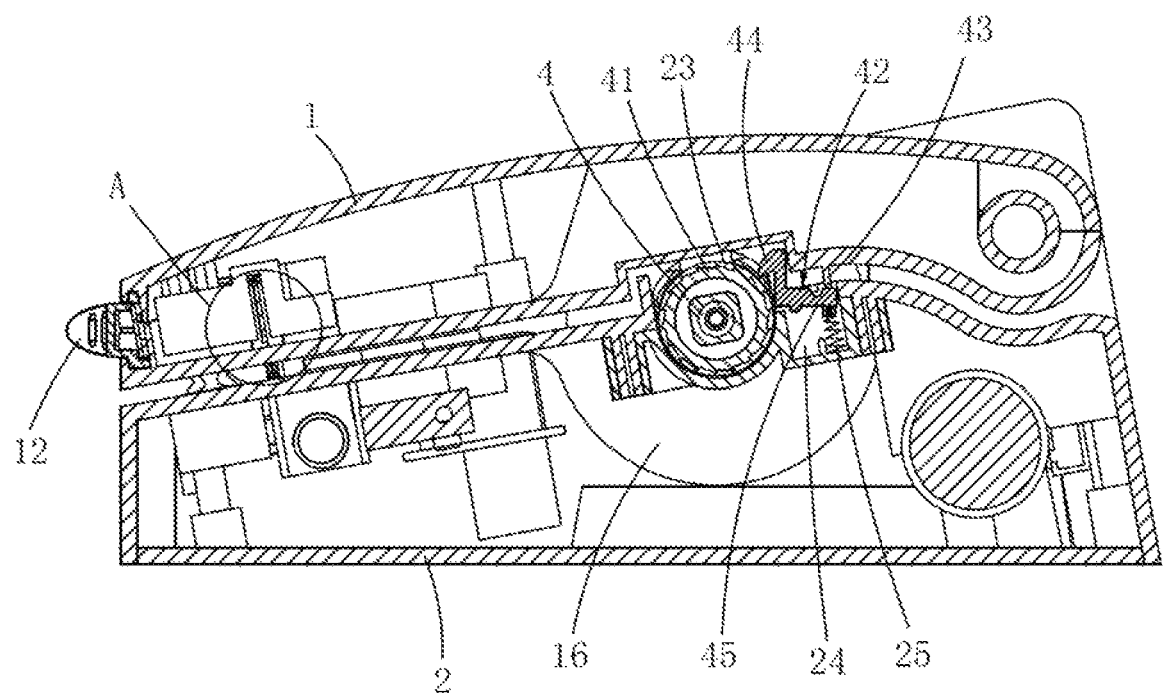
FIG. 3 is a schematic diagram of an internal structure according to the present invention.
Figure 4:
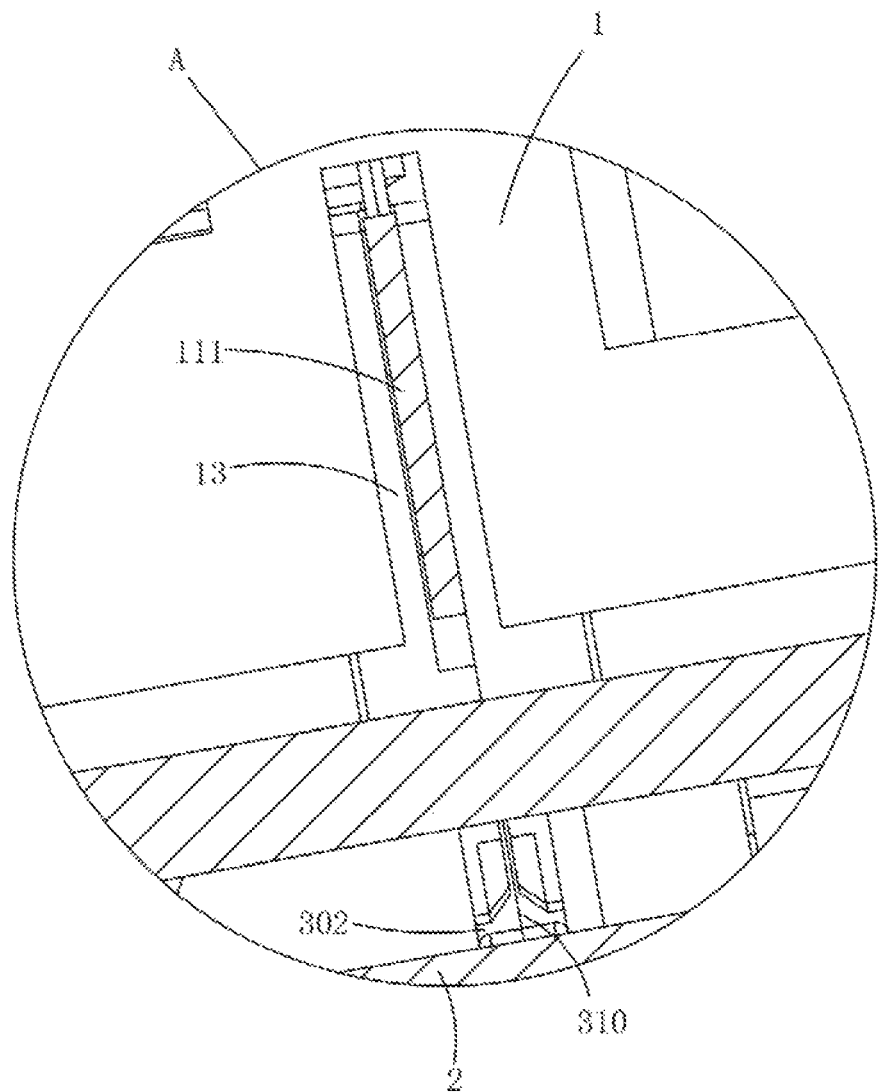
FIG. 4 is a partial enlarged diagram of part A in FIG. 3.
Figure 5:
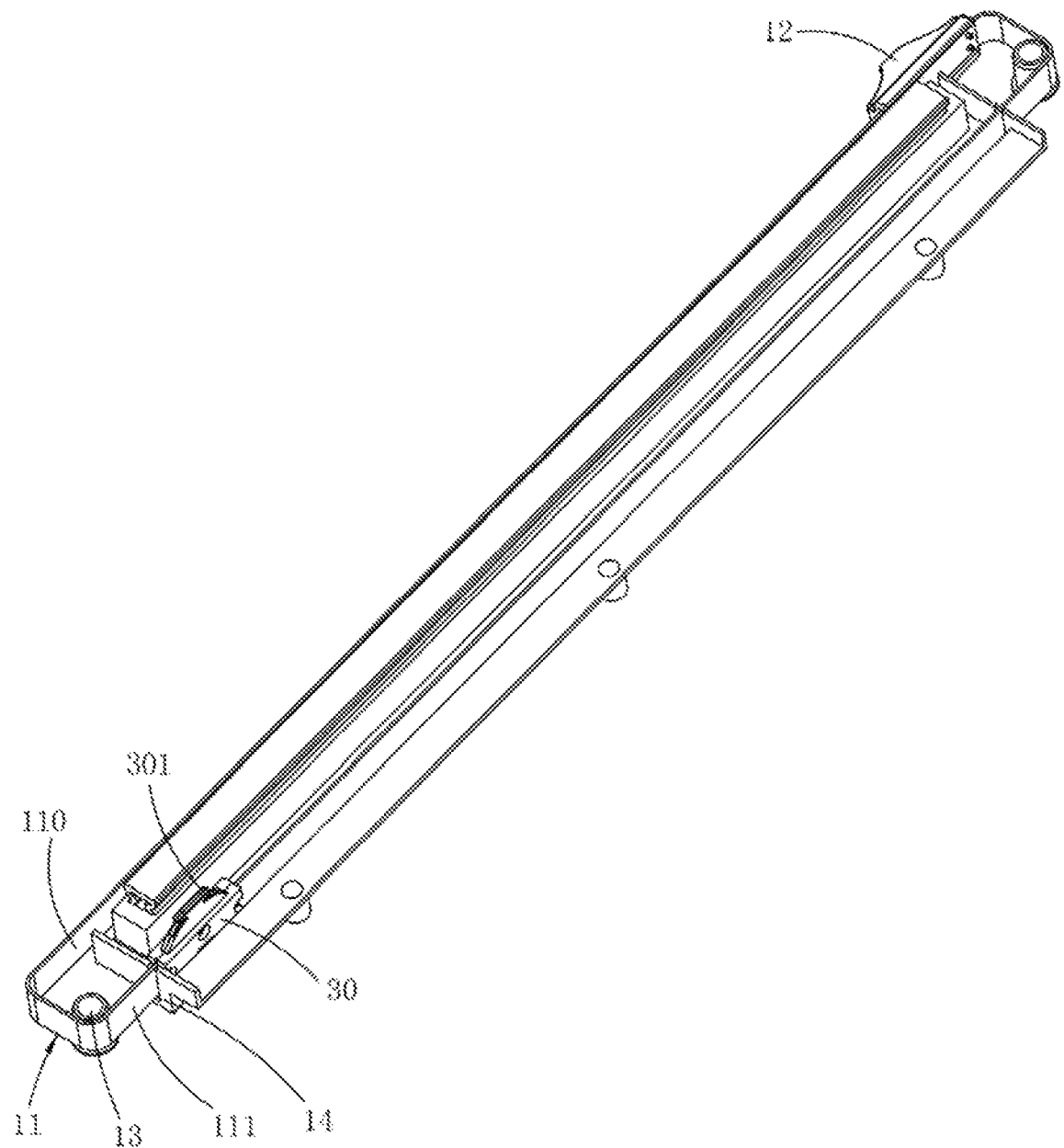
FIG. 5 is a schematic diagram of a structure of a belt provided with a pushing portion and a cutter device.
Figure 6:
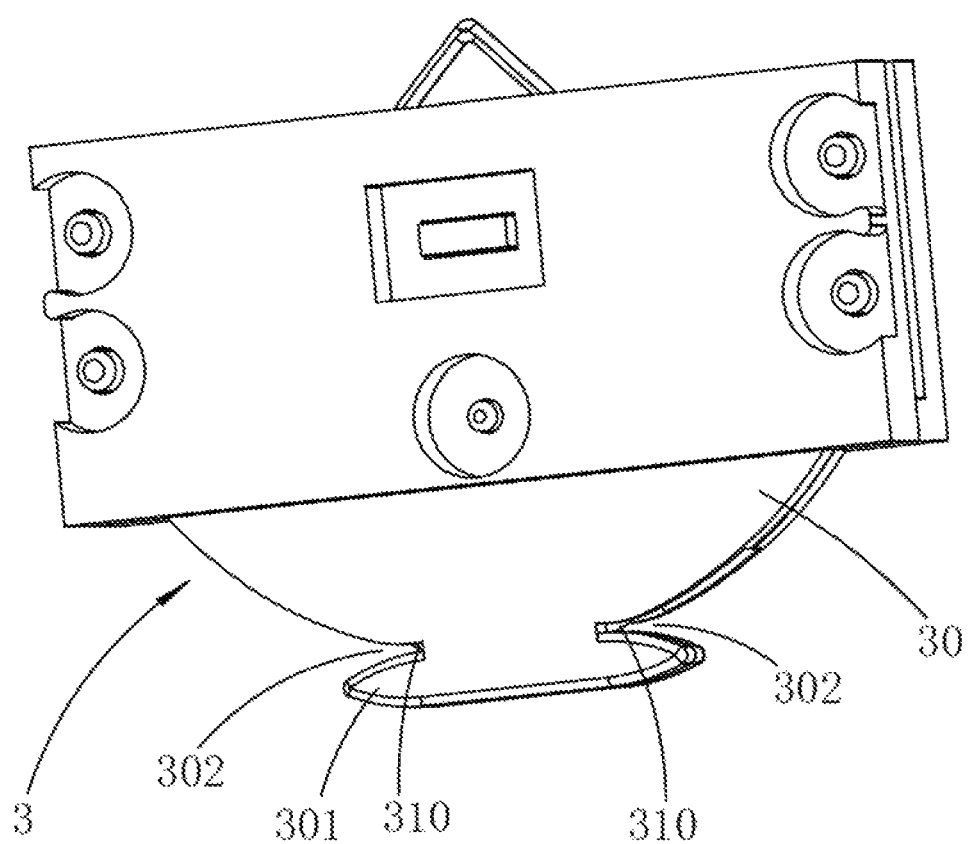
FIG. 6 is a schematic diagram of a structure of a cutter device according to the present invention.
Figure 7:
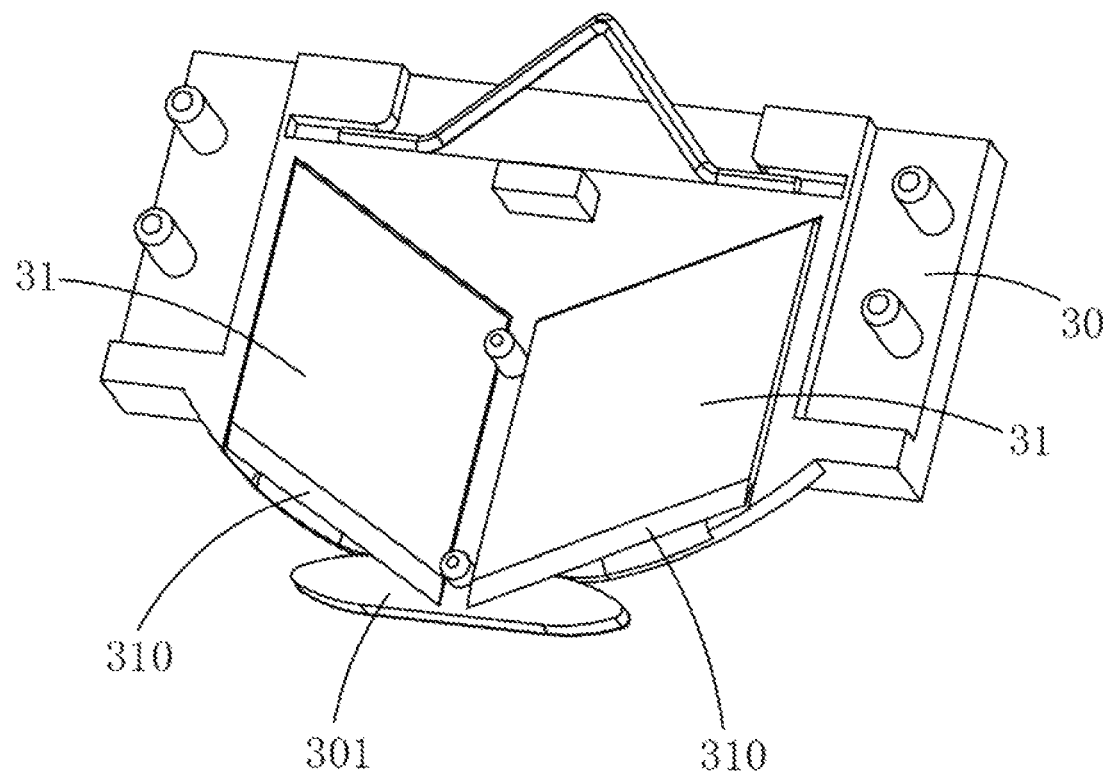
FIG. 7 is a schematic diagram of an internal structure of the cutter device according to the present invention.
Figure 8:
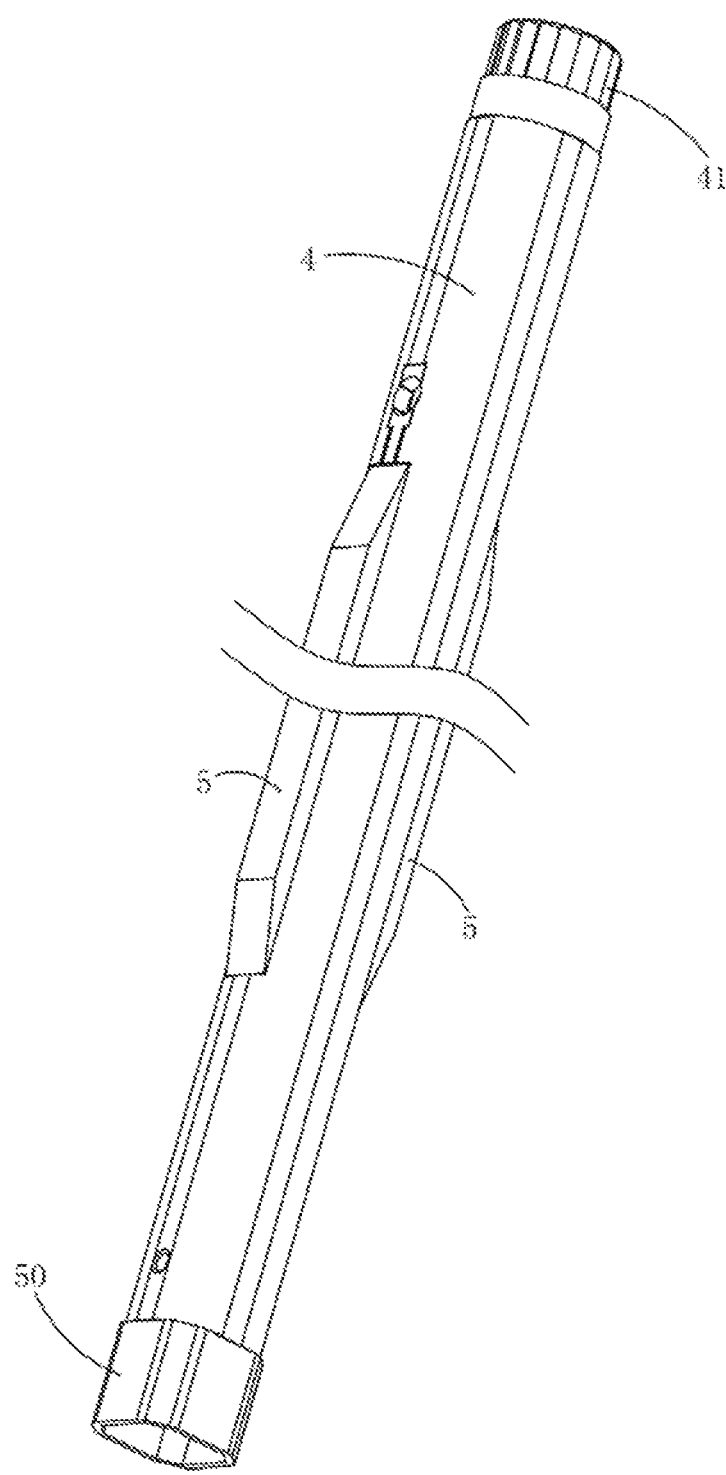
FIG. 8 is a schematic diagram of a structure of an automatic rollback shaft according to the present invention.
Figure 9:
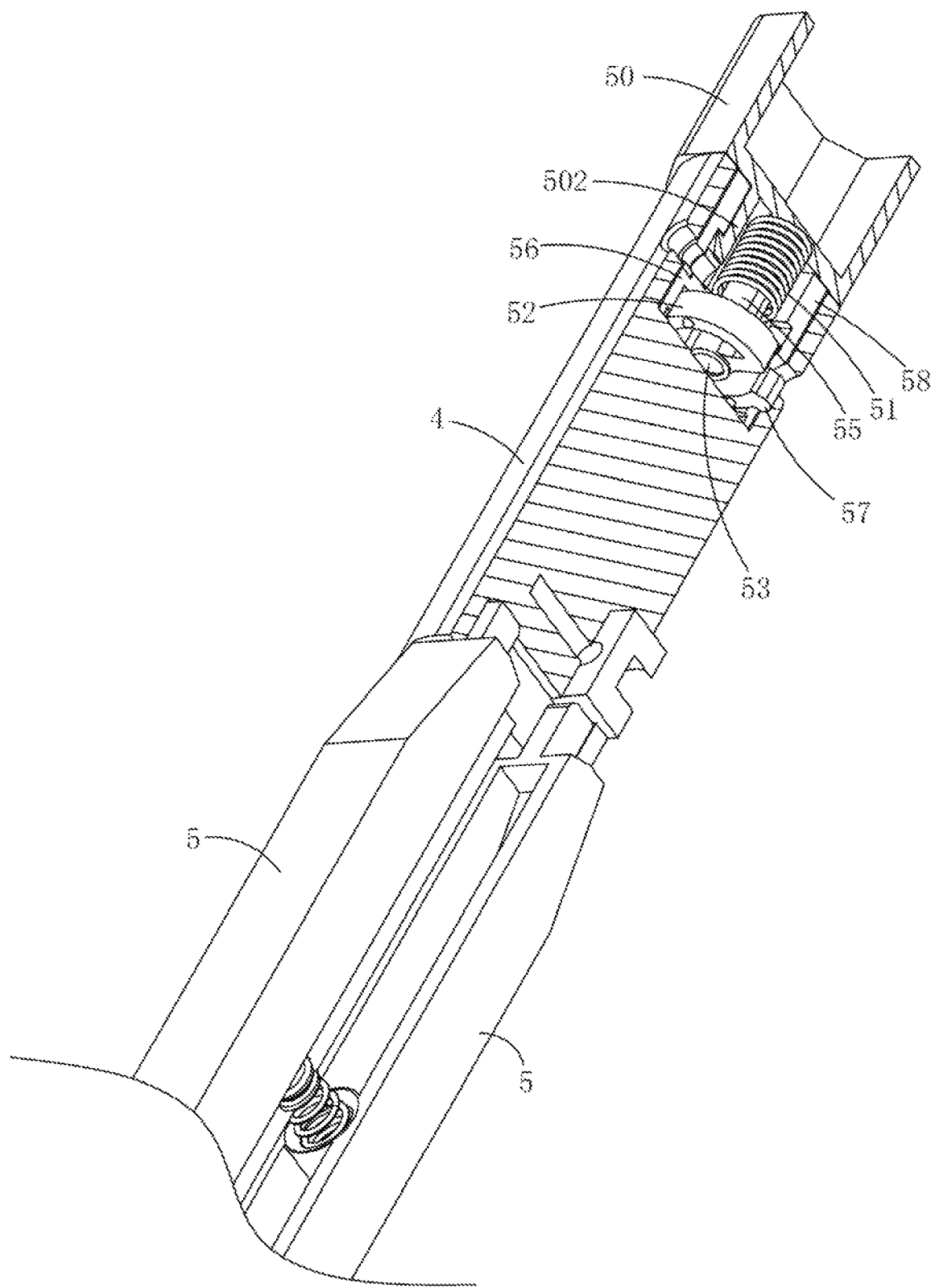
FIG. 9 is a schematic diagram of an internal structure of the automatic rollback shaft according to the present invention.
Figure 10:
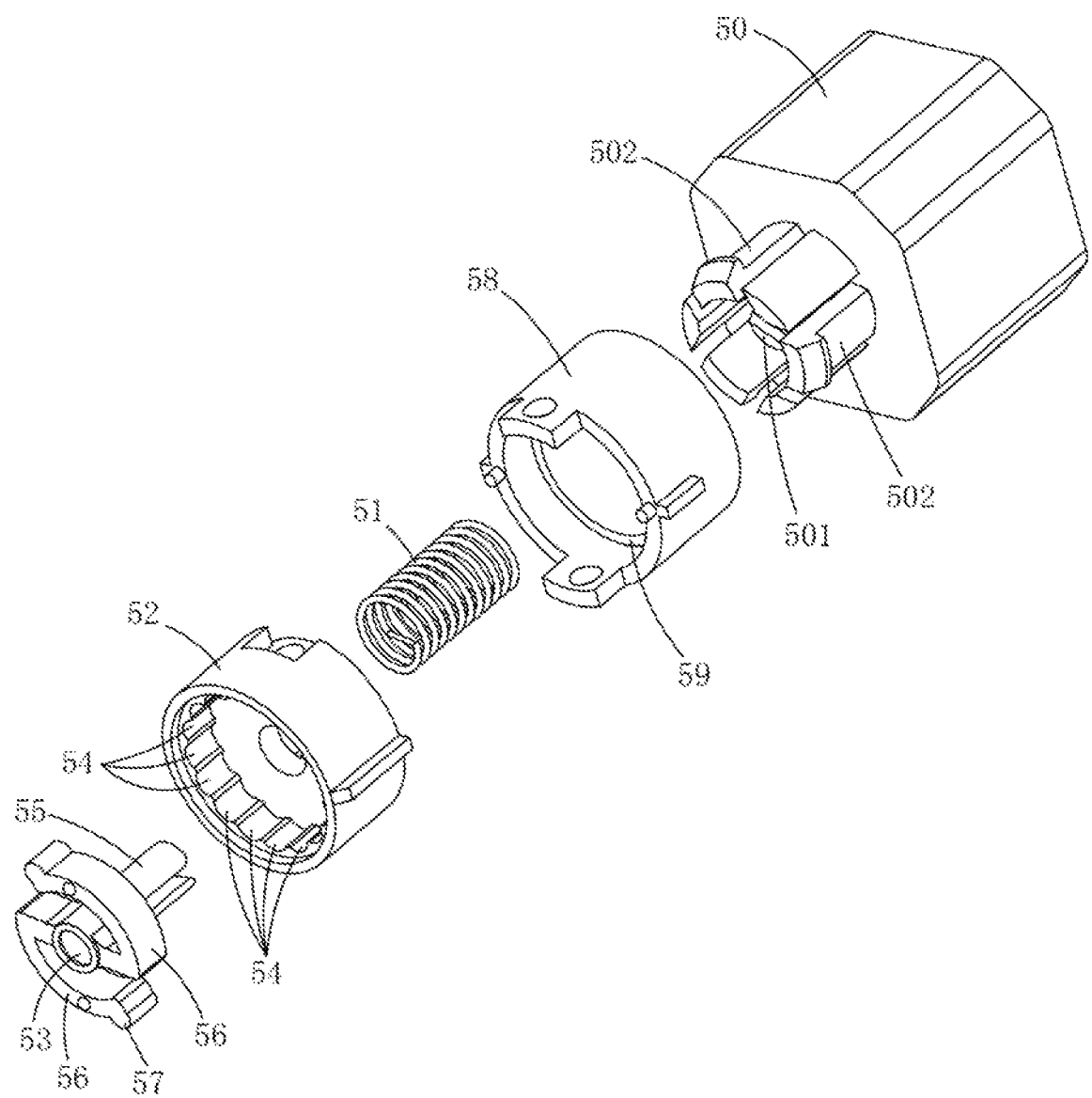
FIG. 10 is a schematic diagram of assembling an elastic rollback mechanism according to the present invention.

1 upper hood, 10 vacuum packaging bag roll, 11 belt, 110 driving belt body, 111 driven belt body, 12 pushing portion, 13 limiting sliding groove, 14 transmission stud, 15 sliding groove, 16 bag receiving chamber.

2 lower hood, 20 heat-seal bar, 21 evacuative groove, 22 clearance groove, 23 shaft mounting cavity, 24 latch chamber, 25 spring.

3 cutter device, 30 cutter box, 301 hook portion, 302 bag putting notch, 31 blade, 310 cutting edge.

4 automatic rollback shaft, 41 driving wheel, 42 unidirectional rotation limiting latch, 43 unlocking rod, 44 latch hook, 45 unlocking driving portion.

5 elastic supporting plate, 50 end cap, 501 connecting portion, 502 buckling foot, 51 elastic energy storage element, 52 inner cap, 53 torsion transmitting element, 54 recess, 55 torsion shaft, 56 elastic clamping arm, 57 projection, 58 middle cap, 59 snap ring.

DETAILED DESCRIPTION

Only preferable embodiments of the present invention are described in the following, but not to limit the protection scope of the present invention.

First Embodiment

A bag-cutting sealing method of a household vacuum sealer, including the following steps of:

1) fixing a vacuum packaging bag roll 10 at an automatic rollback shaft 4, mounting two end portions of the automatic rollback shaft 4 in a shaft mounting cavity 23 at two sides of the household vacuum sealer, such that the vacuum packaging bag roll 10 is received in a bag receiving chamber 16 of the household vacuum sealer;

2) pulling the vacuum packaging bag roll 10 by an appropriate length out of the household vacuum sealer with the bag stretching across a top surface of a hood 2, locating the bag to be cut off in an evacuative groove 21 which is arranged on a lower hood 2 and configured to evacuate; in pulling out the bag, the automatic rollback shaft 4 goes after to rotate, and part of a torsion generated in the rotation of the automatic rollback shaft 4 is transmitted to an elastic energy storage element in an elastic rollback mechanism by means of the elastic rollback mechanism mounted at an end portion of the automatic rollback shaft 4, such that the elastic rollback mechanism exerts an acting force to the automatic rollback shaft 4 for realizing its reverse rotation; locking the automatic rollback shaft 4 to prevent its reverse rotation by an unidirectional rotation limiting latch 42 installed on the lower hood 2;

3) keeping the pulled-out bag still and locking an upper hood 1, pressing tightly the bag by the upper hood 1 locked onto the lower hood 2, abutting the unidirectional rotation limiting latch 42 mounted on the lower hood 2 by an unlocking rod 43 fixed on the upper hood 1, such that the unidirectional rotation limiting latch 42 unlocks the automatic rollback shaft 4 which reversely rotates and strains the bag due to the torsion of the elastic rollback mechanism, so as to tension the bag at the top surface of the lower hood 2;

4) cutting off the bag: sliding the cutter device 3 mounted on the upper hood 1 from one side to the other side, cutting off the tensioned bag by a cutter 31 of the cutter device 3 which protrudes from a bottom surface of the upper hood 1 and is located at the side of the evacuative groove 21, the automatic rollback shaft 4 reversely rotating due to the torsion of the elastic rollback mechanism, and automatically rolling the cut-off bag outside the bag receiving chamber 16 back onto the vacuum packaging bag roll 10 in the bag receiving chamber 16;

5) heat sealing the bag: heat sealing the end portion of the bag by a heat-seal bar 20 which is mounted on the lower hood 2, is located at the side of the evacuative groove 21 and is configured to heat seal after evacuation; this step is set to be conducted automatically after the upper hood 1 is locked or to be conducted after the user touches the corresponding control key;

6) opening the upper hood 1, the unlocking rod 43 of the upper hood 1 releasing from the unidirectional rotation limiting latch 42 with the rotation of the upper hood 1, the elastic unidirectional locking mechanism resetting and locking the automatic rollback shaft 4;

7) taking out the cut-off bag to finish the heat-sealing of the end portion of the bag.

In the present invention, one end portion of the pulled-out bag of the vacuum packaging bag roll 10 is cut off and heat sealed, which is performed by the existing heat-seal bar 20 of the household vacuum sealer. After the hood is opened, the vacuum packaging bag roll can be automatically rolled back, which has reduced number of operation steps for the user, and exhibits ease and quickness of operation. As for the related structure of the household vacuum sealer in the steps of the present invention, please refer to the second embodiment.

In order to evacuate and heat seal the vacuum packaging bag with an article such as food, the opening of the vacuum packaging bag is inserted into the evacuative groove 21 of the household vacuum sealer, the upper hood 1 is then locked, the vacuum pump is started, the vacuum packaging bag is evacuated through the evacuative groove 21 at the opening of the vacuum packaging bag, and then the vacuum packaging bag is heat sealed by the opening of the heat-seal bar 20, to finish evacuation and heat seal.

Second Embodiment

As shown in FIGS. 1 to 10, a household vacuum sealer includes an upper hood 1 and a lower hood 2, wherein the upper hood 1 is rotatably mounted on the lower hood 2, a cutter device 3 is slidably arranged on the upper hood 1, a heat-seal bar 20 and an evacuative groove 21 are arranged at a front position of the upper portion of the lower hood 2, the upper hood 1 and/or the lower hood 2 is provided with a bag receiving chamber 16 for receiving the vacuum packaging bag roll 10, a detachable automatic rollback shaft 4 is rotatably mounted in the bag receiving chamber 16, for passing through a shaft cavity in the middle of the vacuum packaging bag roll 10, and can be taken out, an elastic rollback mechanism and an elastic unidirectional locking mechanism are mounted at the end portion of the automatic rollback shaft 4, the elastic rollback mechanism is configured to automatically roll the rollback shaft 4 back, and the elastic unidirectional locking mechanism is configured to lock the automatic rollback shaft 4, prevent its rollback due to an elastic force of the elastic rollback mechanism and enables the automatic rollback shaft 4 only to rotate in a single direction. In the present invention with a simple structure, the bag can be rolled back automatically after cut off, which has reduced number of operation steps for the user, and exhibits ease of operation.

The top half of the cutter device 3 is slidably mounted in the front end portion of the upper hood 1, and the lower portion of the cutter device 3 protrudes from the bottom surface at the front end portion of the lower hood 2 upon cutting the bag. Specifically, at least one pushing portion 12 is arranged at the upper portion of the cutter device 3, at least one cutter is arranged at its lower portion; at least one sliding groove 15 is arranged at the top surface or the front end surface of the upper hood 1, the pushing portion 12 is slidably mounted in the sliding groove 15; the cutter protrudes from the bottom surface of the lower hood 2 upon cutting the bag; after the upper hood 1 is locked onto the lower hood 2, the cutter moves at one side of the heat-seal bar 20 or one side of the evacuative groove 21 back and forth, for cutting off the bag pressed tightly between the upper hood 1 and the lower hood 2.

Figure 11:
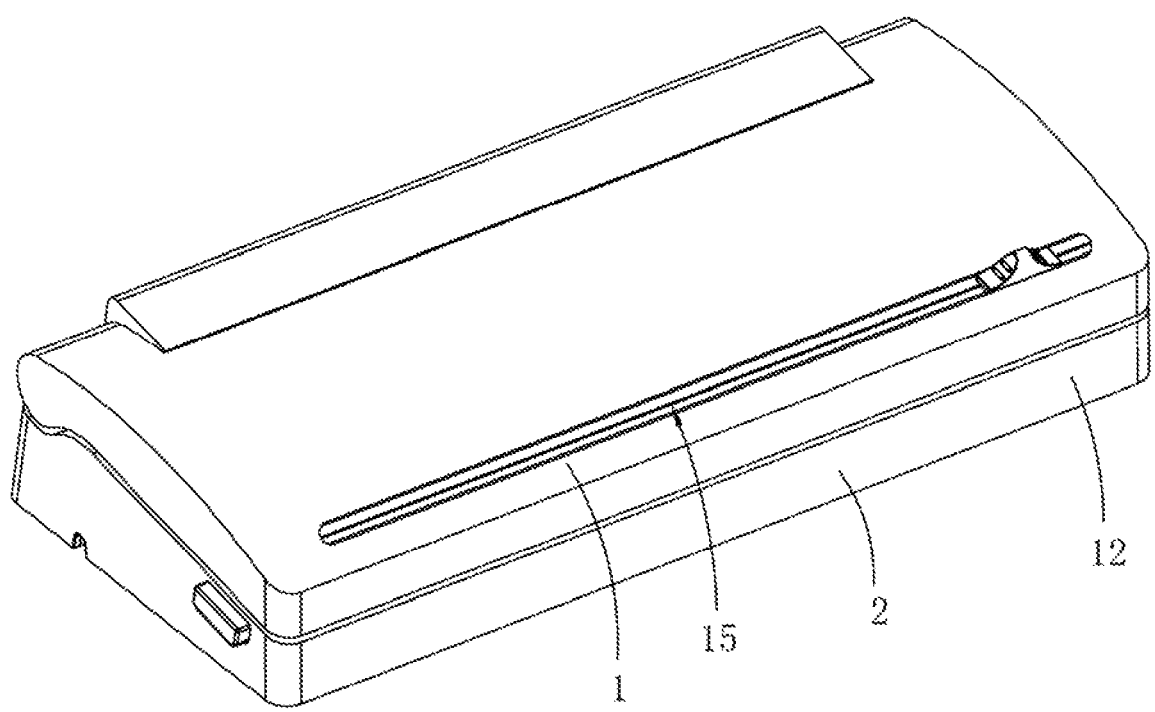
FIG. 11 is a schematic diagram of a structure of the household vacuum sealer with a sliding groove arranged at a front side of the top surface of the upper hood.

The pushing portion 12 protrudes from the front end surface of the upper hood 1; the cutter device 3 and the cutter are kept protruding at the bottom surface of the lower hood 2 all the time, as shown in FIG. 1; or, the pushing portion 12 protrudes from the front side of the top surface of the upper hood 1, as shown in FIG. 11.

In a preferable embodiment, the cutter device 3 and the cutter protrude from the bottom surface of the lower hood 2 only upon cutting the bag; the cutter device 3 or the pushing portion 12 drives the cutter to eject downwards due to an external force or a switching mechanism.

At least one cutter device 3 is slidably mounted on the upper hood 1, and protrudes from the bottom surface of the lower hood 2. After the upper hood 1 is locked onto the lower hood 2, the cutter moves at one side of the heat-seal bar 20 or one side of the evacuative groove 21 back and forth, for cutting off the bag pressed tightly between the upper hood 1 and the lower hood 2. One end portion of the bag is cut off and heat sealed at the heat-seal bar 20 of the lower hood 2, the inner end portion or the outer end portion of the bag is pulled out to the heat-seal bar 20, the upper hood 1 is locked and the inner end portion or the outer end portion of the bag is heat sealable. The bag can be cut off as long as the cutter device 3 slides, to form the vacuum packaging bag with one open end. The bag with one heat sealable end is evacuated and heat sealed at the heat-seal bar 20 and the evacuative groove 21 of the lower hood 2. In the present invention, the operation steps of the household vacuum sealer to cut off the bag and heat seal the bag end portion have been completely changed, and they become simpler and quicker. The use and operation steps of the household vacuum sealer refer to the first embodiment.

When the bag is pulled out, the automatic rollback shaft 4 goes after to rotate. While the automatic rollback shaft 4 rotates, the torsion is transmitted to the elastic rollback mechanism, such that the elastic rollback mechanism has a certain elastic force.

Specifically, a rear end portion of the upper hood 1 is rotatably mounted at a rear end portion of the lower hood 2, the heat-seal bar 20 and the evacuative groove 21 are arranged at a top surface of the front end portion of the lower hood 2, the heat-seal bar 20 and the evacuative groove 21 are arranged alternately in parallel and extend along a length direction of the lower hood 2, the bag receiving chamber 16 is disposed at the top surface of the rear end portion of the lower hood 2, the left and right end portions of the bag receiving chamber 16 are provided with a shaft mounting cavity 23 respectively, the left and right end portions of the automatic rollback shaft 4 are movably placed in the left and right shaft mounting cavities 23 respectively, and the automatic rollback shaft 4 is rotatable when the bag is pulled out.

The elastic unidirectional locking mechanism includes a driving wheel 41, a unidirectional rotation limiting latch 42 and an unlocking rod 41 for changing the state of the unidirectional rotation limiting latch 42, wherein the driving wheel 41 is fixed at a first end portion of the automatic rollback shaft 4, the unidirectional rotation limiting latch 42 is movably mounted on the lower hood 2, and is elastically abutted against the driving wheel 41 for enabling only the unidirectional rotation of the automatic rollback shaft 4 and rolling out the bag; the unlocking rod 43 is fixed on the upper hood 1, and touches the unidirectional rotation limiting latch 42 after the upper hood 1 is locked onto the lower hood 2, to unlock the driving wheel 41 by the unidirectional rotation limiting latch 42. The driving wheel 41 is in a free status, and the automatic rollback shaft 4 reversely rotates under the elastic force of the elastic rollback mechanism, that is to roll back, so as to wind back the pulled-out bags.

A latch chamber 24 is arranged on the lower hood 2, the upper portion of the latch chamber 24 communicates with that of the shaft mounting cavity 23 for receiving the first end portion of the automatic rollback shaft 4; the unidirectional rotation limiting latch 42 is rotatably mounted in the latch chamber 24, the front end portion of the unidirectional rotation limiting latch 42 passes through the upper portion of the latch chamber 24 to extend into its adjacent shaft mounting cavity 23; a spring 25 is mounted in the latch chamber 24, and is connected with the unidirectional rotation limiting latch 42, for exerting an elastic force to the unidirectional rotation limiting latch 42 such that it elastically abuts against the driving wheel 41.

Several hook teeth are formed at the wheel body or surface of the driving wheel 41 in a circumferential direction, and are selectable from ratchets, helical teeth, snap teeth, snap studs, snap holes or snap caves; a latch hook 44 is formed at a first side of the unidirectional rotation limiting latch 42, an unlocking driving portion 45 is formed at its second side, a driving slot is formed on the unlocking driving portion 45, the middle of the unidirectional rotation limiting latch 42 is pivotably connected to the lower hood 2, the latch hook 44 passes through the upper portion of the latch chamber 24 and extends into its adjacent shaft mounting cavity 23, the latch hook 44 is elastically abutted against the hook teeth of the driving wheel 41, the lower end of the spring 25 is mounted to the bottom of the latch chamber 24, and its upper end is connected to the unlocking driving portion 45, for exerting an upward elastic force to the unlocking driving portion 45; after the upper hood 1 is locked onto the lower hood 2, the unlocking rod 43 is inserted into the driving slot, for driving the latch hook 44 to move upwards and release from the hook teeth, so as to unlock the driving wheel 41 by the unidirectional rotation limiting latch 42.

The elastic rollback mechanism includes an end cap 50, an elastic energy storage element 51 and an inner cap component, wherein an embedding chamber is arranged at a second end portion of the automatic rollback shaft 4, an inner cap component is fixed in the embedding chamber; the end cap 50 is rotatable mounted at the inner cap component, the end cap 50 protrudes from a second end portion of the automatic rollback shaft 4, and the end cap 50 is movably snapped in the shaft mounting cavity 23 for receiving the second end portion of the automatic rollback shaft 4, the first end of the elastic energy storage element 51 is connected with the inner cap component, and the second end thereof is connected with the end cap 50.

The inner cap component includes an inner cap 52 and a torsion transmitting element 53, wherein a torsion chamber is arranged at one side of the inner cap 52, the torsion transmitting element 53 is rotatably mounted into the torsion chamber, several recesses 54 are formed at an inner wall surface of the torsion chamber in a circumferential direction, a shaft hole is arranged in the middle of the inner cap 52; a torsion shaft 55 protrudes from one side of the torsion transmitting element 53 towards the end cap 50, the torsion shaft 55 is rotatably mounted to the shaft hole of the inner cap 52, an outer end portion of the torsion shaft 55 passes through the shaft hole, and is connected to the first end of the elastic energy storage element 51; at least two elastic clamping arms 56 extend out of the torsion transmitting element 53 in a radial direction, at least one elastic zigzag portion is arranged in the middle of the elastic clamping arm 56; a projection 57 is formed at an outer end portion of the elastic clamping arm 56, and is elastically abutted in the recess 54 at the inner wall surface of the torsion chamber; the projection 57 and the recess 54 have a stationary fit status and a tripping fit status, the projection 57 has a cylindrical outer side surface, the recess 54 has an arc surface whose shape is matched with that of the outer side surface of a protruding stud; a groove is arranged at an outer end portion of the torsion shaft 55, the first end of the elastic energy storage element 51 is clamped in the first groove of the torsion shaft 55; a connecting portion 501 is formed in the middle of one side of the end cap 50 towards the middle cap 58, each buckling foot 502 is distributed in the ring-shaped region of an outer edge of the connecting portion 501; the outer end portion of the connecting portion 501 is provided with a second groove, and the first end of the elastic energy storage element 51 is clamped in the second groove of the connecting portion 501.

In the case that the elastic force of the elastic energy storage element 51 is less than a friction force between the projection 57 and the recess 54, the projection 57 and the recess 54 are in a stationary fit status, the automatic rollback shaft 4 drives the inner cap 52, the elastic clamping arm 56 and the torsion shaft 55 to rotate upon rotating, and the elastic energy storage element 51 is in a state of energy storage upon the rotation of the torsion shaft 55.

In the case that the elastic force of the elastic energy storage element 51 is larger than the friction force between the projection 57 and the recess 54, the projection 57 and the recess 54 are in a tripping fit status, the automatic rollback shaft 4 drives the inner cap 52 to rotate upon rotating, the elastic clamping arm 56 is substantially stationary in the torsion chamber, and the projection of the elastic clamping arm 56 skips to the next adjacent recess 54 from the current matched recess 54 while the inner cap 52 rotates with respect to the elastic clamping arm 56.

The inner cap component includes a middle cap 58, the first side of the middle cap 58 is fixed to the inner cap 52, the inner end portion of the end cap 50 is rotatably mounted to the middle cap 58 which is provided with an energy storage cavity in the middle, the elastic energy storage element 51 is located in the energy storage cavity and is selected from one of elastic steel wire, torsional spring, spiral spring or shrapnel.

A through hole is arranged in the middle of the middle cap 58, and is less than the energy storage cavity. A snap ring 59 is formed at a connected surface between the through hole and the energy storage cavity, several buckling feet 502 are formed at one side of the end cap 50 towards the middle cap 58, each buckling foot 502 passes through the through hole and is movably buckled to the snap ring 59 respectively, and an outer side surface of each buckling foot 502 has an arc surface with the same radius, and an outer side surface of each buckling foot 502 is rotatably matched with the through hole.

At least one groove chamber is formed at the surface of the automatic rollback shaft 4, the groove chamber extends in the length direction of the automatic rollback shaft 4, an elastic supporting plate 5 for being supported in the shaft cavity of the vacuum packaging bag roll 10 is mounted in the groove chamber, and a spring 25 is mounted at the bottom surface of the elastic supporting plate 5, for elastically abutting against the elastic supporting plate 5 outwards, which is adapted to the shaft-cavity vacuum packaging bag rolls 10 with different inner diameters.

A rear end portion of the upper hood 1 is rotatably mounted at a rear end portion of the lower hood 2, the heat-seal bar 20 and the evacuative groove 21 are arranged at a top surface of the front end portion of the lower hood 2, the heat-seal bar 20 and the evacuative groove 21 are arranged alternately in parallel and extend along a length direction of the lower hood 2. The top half of the cutter device 3 is slidably mounted in the front end portion of the upper hood 1, and the lower portion of the cutter device 3 protrudes from the bottom surface at the front end portion of the lower hood 2. The cutter is fixed at the cutter device 3, and moves between the heat-seal bar 20 and the evacuative groove 21 back and forth after the upper hood 1 is locked onto the lower hood 2.

A belt 11 is mounted inside the front end portion of the upper hood 1; at least one sliding portion 12 is slidably mounted at the top surface or front end surface of the front end portion of the upper hood 1, for driving the belt 11 to move back and forth; the pushing portion 12 can be set as a plectrum, a button or a push rod, an inner end portion of the pushing portion 12 is fixed to the belt 11; the cutter device 3 is fixed to the belt 11 which drives the cutter device 3 to move back and forth therewith upon moving back and forth, a sliding groove 15 is disposed at a front end surface of the upper hood 1, and the pushing portion 12 is slidably mounted in the sliding groove. The belt 11 is movable back and forth as long as the pushing portion 12 is dragged or pushed back and forth, and the cutter device 3 is driven to move back and forth by the belt 11.

A limiting sliding groove 13 is arranged at the bottom surface of the upper hood 1, and is parallel with the heat-seal bar 20 or the evacuative groove 21, several transmission studs 14 are mounted in the upper hood 1, the annular belt 11 is tensioned into a square shape by the transmission studs 14, the part of the belt 11 close to the outer end surface of the upper cover 1 is a driving belt body 110, the part of the belt 11 away from the outer end surface of the upper cover 1 is a driven belt body 111, the pushing portion 12 is fixed to the driving belt body 110, the cutter device 3 is fixed at a driven belt body 111 which slides in the limiting sliding groove 13 back and forth together with the cutter device 3. The driving belt both 110 moves opposite to the driven belt body 111. For example, when the pushing portion 12 is dragged or pushed to the left, the driving belt body 110 moves to the left, and the driven belt body 111 drives the cutter device 3 to move to the right.

The cutter device 3 includes a cutter box 30 and two blades 31. One side of the blade 31 has one cutting edge 310, and the blade 31 can be formed by breaking off a blade of a box cutter of the prior art along its fold, so there is no need to particularly customize or produce the blade 31, with low costs. The two blades 31 are fixed at the left and right sides of the cutter box 30 respectively, and the cutting edges 310 of the two blades 31 towards the outer side. The cutting edges 310 of the two blades 31 incline. The bag can be cut off as long as the cutter moves to either side. A hook portion 301 is formed at the lower portion of the cutter box 30, the middle of the hook portion 301 is connected to the cutter box 30, two bag putting notches 302 are formed at the left and right sides over the hook portion 301 respectively, and the cutting edges 310 of the two blades 31 protrude in the bag putting notch 302 respectively. The cutting edge 310 is located at an inner end portion of the bag putting notch 302, and an acute angle is formed between the inclining cutting edge 310 and the bottom surface of the bag putting notch 302. That is, the blade 31 and the cutting edge 310 are hidden in the bag putting notch 302, which prevent human hands from being scratched by the cutting edge 310 of the blade 31.

A clearance groove 22 is arranged on the lower hood 2. After the upper hood 1 is locked onto the lower hood 2, the hook portion 301 is inserted into the clearance groove 22 and slides in the clearance groove 22 back and forth, and the clearance groove 22 is located between the heat-seal bar 20 and the evacuative groove 21. The bag pressed tightly between the upper hood 1 and the lower hood 2 is located in an opening of the bag putting notch 302 in a height direction. When the cutter device 3 moves towards the bag, the edge of the bag automatically slides and inserts into the bag putting notch 302. The bag is positioned by the bag putting notch 302, and the edge of the bag is supported strongly, which prevents the displacement of the bag. The bag can be cut off smoothly while the cutter is moved, which saves effort, and is more stable to cut off the bag.

The foregoing merely describes preferable embodiments of the present invention. For persons skilled in the art, according to the concepts of the present invention, amendments to the embodiments and application scope can be made, and the contents of the present invention shall not be interpreted as limitations to the present invention.

What is claimed is:

1. A household vacuum sealer, comprising an upper hood, a lower hood and a cutter device, wherein the upper hood is rotatably mounted on the lower hood, the cutter device is slidably mounted on the upper hood, at least one heat-seal bar and at least one evacuative groove are arranged at an upper portion of the lower hood, the upper hood and/or the lower hood is provided with a bag receiving chamber, wherein at least one pushing portion is arranged at an upper portion of the cutter device; at least one sliding groove is disposed at a top surface or a front end surface of the upper hood, the at least one pushing portion is slidably mounted in the sliding groove; the cutter device protrudes from a bottom surface of the upper hood at least upon cutting a bag; after the upper hood is locked onto the lower hood, the cutter device moves at one side of the heat-seal bar or one side of the evacuative groove back and forth, for cutting off the bag pressed tightly between the upper hood and the lower hood;
    wherein the cutter device comprises a cutter box and a cutter, wherein the cutter comprises at least one blade, one side of the blade has one cutting edge facing toward an outer side;
    wherein the cutter comprises two blades, each of which is formed by breaking off a blade of a box cutter along its fold; the two blades are fixed at the left and right sides of the cutter box respectively, and the cutting edges of the two blades incline and face towards the outer side respectively, and are arranged in a "V" shape;
    wherein a hook portion is formed at the lower portion of the cutter box, the middle of the hook portion is connected to the cutter box, two bag putting notches are formed at the left and right sides over the hook portion respectively, and the cutting edges of the two blades protrude in the bag putting notch respectively;
    wherein a clearance groove is arranged on the lower hood, after the upper hood is locked onto the lower hood, the hook portion is inserted into the clearance groove and slides in the clearance groove back and forth, and the bag pressed tightly between the upper hood and the lower hood is located in an opening of at least one of the bag putting notches in a height direction; the cutting edge is located at an inner end portion of the at least one of the bag putting notches, and an acute angle is formed between the inclining cutting edge and the bottom surface of the at least one of the bag putting notches.

2. The household vacuum sealer according to claim 1, wherein the at least one pushing portion of the cutter device is slidably mounted in the top surface of the upper hood, the lower portion of the cutter device protrudes from the bottom surface at the front end portion of the lower hood at least upon cutting the bag; the at least one pushing portion protrudes from the top surface or the front end surface of the upper hood; the cutter device and the cutter are kept protruding from a bottom surface of the upper hood; or the cutter device and the cutter protrude from the bottom surface of the lower hood only upon cutting the bag; the cutter device or the at least one pushing portion drives the cutter to eject downwards due to an external force or a switching mechanism.

3. The household vacuum sealer according to claim 1, wherein a belt is mounted inside the front end portion of the upper hood; the at least one pushing portion is slidably mounted at the top surface or front end surface of the front end portion of the upper hood, for driving the belt to move back and forth; an inner end portion of the at least one pushing portion is fixed to the belt; the cutter device is fixed to the belt which drives the cutter device to move back and forth upon moving back and forth.

4. The household vacuum sealer according to claim 1, wherein a limiting sliding groove is arranged at the bottom surface of the upper hood, and is parallel with the heat-seal bar or the evacuative groove, several transmission studs are mounted in the upper hood, the annular belt is tensioned into a square shape by the transmission studs, the part of the belt close to the outer end surface of the upper cover is a driving belt body, the part of the belt away from the outer end surface of the upper cover is a driven belt body, the at least one pushing portion is fixed to the driving belt body, the cutter device is fixed at a driven belt body which slides in the limiting sliding groove back and forth together with the cutter device.

5. The household vacuum sealer according to claim 1, wherein a rear end portion of the upper hood is rotatably mounted at a rear end portion of the lower hood, the heat-seal bar and the evacuative groove are arranged at a top surface of the front end portion of the lower hood, the heat-seal bar and the evacuative groove are arranged alternately in parallel and extend along a length direction of the lower hood, the bag receiving chamber is disposed at the top surface of the rear end portion of the lower hood, the left and right end portions of the bag receiving chamber are provided with a shaft mounting cavity respectively; a detachable automatic rollback shaft is rotatably mounted in the bag receiving chamber, for passing through a shaft cavity in the middle of the vacuum packaging bag roll the left and right end portions of the automatic rollback shaft are movably placed in the left and right shaft mounting cavities respectively; the elastic rollback mechanism for automatically rolling the rollback shaft back and the elastic unidirectional locking mechanism for locking the automatic rollback shaft are mounted at the end portion of the automatic rollback shaft.

6. The household vacuum sealer according to claim 5, wherein the elastic unidirectional locking mechanism comprises a driving wheel, a unidirectional rotation limiting latch and an unlocking rod for changing the state of the unidirectional rotation limiting latch wherein the driving wheel is fixed at a first end portion of the automatic rollback shaft, the unidirectional rotation limiting latch is movably mounted on the lower hood, and is elastically abutted against the driving wheel for enabling only the unidirectional rotation of the automatic rollback shaft and rolling out the bag; the unlocking rod is fixed on the upper hood, and touches the unidirectional rotation limiting latch after the upper hood is locked onto the lower hood, to unlock the driving wheel by the unidirectional rotation limiting latch.

7. The household vacuum sealer according to claim 6, wherein a latch chamber is arranged on the lower hood, the upper portion of the latch chamber communicates with that of the shaft mounting cavity for receiving the first end portion of the automatic rollback shaft; the unidirectional rotation limiting latch is rotatably mounted in the latch chamber, the front end portion of the unidirectional rotation limiting latch passes through the upper portion of the latch chamber to extend into its adjacent shaft mounting cavity; a spring is mounted in the latch chamber, and is connected with the unidirectional rotation limiting latch, for exerting an elastic force to the unidirectional rotation limiting latch such that it elastically abuts against the driving wheel.

8. The household vacuum sealer according to claim 7, wherein several hook teeth are formed at the wheel body or surface of the driving wheel in a circumferential direction; a latch hook is formed at a first side of the unidirectional rotation limiting latch, an unlocking driving portion is formed at its second side, a driving slot is formed on the unlocking driving portion the middle of the unidirectional rotation limiting latch is pivotably connected to the lower hood, the latch hook passes through the upper portion of the latch chamber and extends into its adjacent shaft mounting cavity the latch hook is elastically abutted against the hook teeth of the driving wheel, the lower end of the spring is mounted to the bottom of the latch chamber, and its upper end is connected to the unlocking driving portion, for exerting an upward elastic force to the unlocking driving portion; after the upper hood is locked onto the lower hood, the unlocking rod is inserted into the driving slot, for driving the latch hook to move upwards and release from the hook teeth, so as to unlock the driving wheel by the unidirectional rotation limiting latch.

9. The household vacuum sealer according to claim 8, wherein the elastic rollback mechanism comprises an end cap, an elastic energy storage element and an inner cap component, wherein an embedding chamber is arranged at a second end portion of the automatic rollback shaft, an inner cap component is fixed in the embedding chamber; the end cap is rotatably mounted at the inner cap component, the end cap protrudes from a second end portion of the automatic rollback shaft, and the end cap is movably snapped in the shaft mounting cavity for receiving the second end portion of the automatic rollback shaft, the first end of the elastic energy storage element is connected with the inner cap component, and the second end thereof is connected with the end cap; the inner cap component comprises an inner cap, a middle cap and a torsion transmitting element, wherein a torsion chamber is arranged at one side of the inner cap, the torsion transmitting element is rotatably mounted into the torsion chamber, several recesses are formed at an inner wall surface of the torsion chamber in a circumferential direction, a shaft hole is arranged in the middle of the inner cap; a torsion shaft protrudes from one side of the torsion transmitting element towards the end cap, the torsion shaft is rotatably mounted to the shaft hole of the inner cap, an outer end portion of the torsion shaft passes through the shaft hole, and is connected to the first end of the elastic energy storage element; at least two elastic clamping arms extend out of the torsion transmitting element in a radial direction, a projection is formed at an outer end portion of the elastic clamping arm, and is elastically abutted in the recess at the inner wall surface of the torsion chamber; the first side of the middle cap is fixed to the inner cap, the inner end portion of the end cap is rotatably mounted to the middle cap which is provided with an energy storage cavity in the middle, the elastic energy storage element is located in the energy storage cavity and is selected from one of elastic steel wire, torsional spring, spiral spring or shrapnel; a through hole is arranged in the middle of the middle cap, and is less than the energy storage cavity, a snap ring is formed at a connected surface between the through hole and the energy storage cavity, several buckling feet are formed at one side of the end cap towards the middle cap, each buckling foot passes through the through hole and is movably buckled to the snap ring respectively, and an outer side surface of each buckling foot has an arc surface with the same radius, and an outer side surface of each buckling foot is rotatably matched with the through hole; the projection and the recess have a stationary fit status and a tripping fit status, in the case that the elastic force of the elastic energy storage element is less than a friction force between the projection and the recess, the projection and the recess are in a stationary fit status, the automatic rollback shaft drives the inner cap, the elastic clamping arm and the torsion shaft to rotate upon rotating, and the elastic enemy storage element is in a state of energy storage upon the rotation of the torsion shaft; in the case that the elastic force of the elastic energy storage element is larger than the friction force between the projection and the recess, the projection and the recess are in a tripping fit status, the automatic rollback shaft drives the inner cap to rotate upon rotating, the elastic clamping arm is substantially stationary in the torsion chamber, and the projection of the elastic clamping arm skips to the next adjacent recess from the current matched recess while the inner cap rotates with respect to the elastic clamping arm.

10. The household vacuum sealer according to claim 9, wherein the middle portion of the elastic clamping arm has at least one elastic zigzag portion; the projection has a cylindrical outer side surface, the recess has an arc surface whose shape is matched with that of the outer side surface of a protruding stud; a groove is arranged at an outer end portion of the torsion shaft, the first end of the elastic energy storage element is clamped in the first groove of the torsion shaft; a connecting portion is formed in the middle of one side of the end cap towards the middle cap, the outer end portion of the connecting portion is provided with a second groove, the first end of the elastic energy storage element is clamped into the second groove of the connecting portion, each buckling foot is distributed in the ring-shaped region of an outer edge of the connecting portion; at least one groove chamber is formed at the surface of the automatic rollback shaft, the groove chamber extends in the length direction of the automatic rollback shaft, an elastic supporting plate for being supported in the shaft cavity of the vacuum packaging bag roll is mounted in the groove chamber, and a spring is mounted at the bottom surface of the elastic supporting plate, for elastically abutting against the elastic supporting plate outwards.

* * * * *